May 29, 1934.　　　T. O'CONNOR ET AL　　　1,960,918
DUPLICATE TICKET RECEIPT REGISTER
Filed Jan. 27, 1930　　3 Sheets-Sheet 1
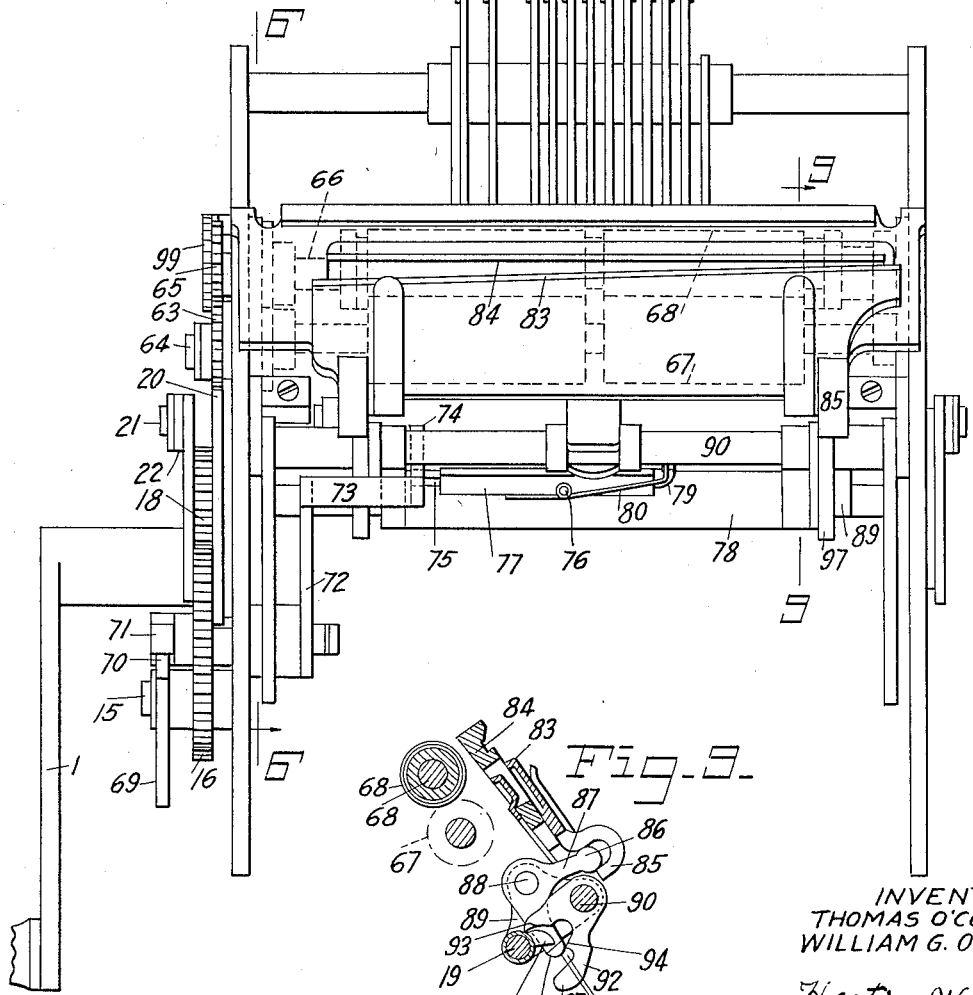
INVENTOR.
THOMAS O'CONNOR
WILLIAM G. ORTH.
Hastings W. Baker
ATTORNEY.

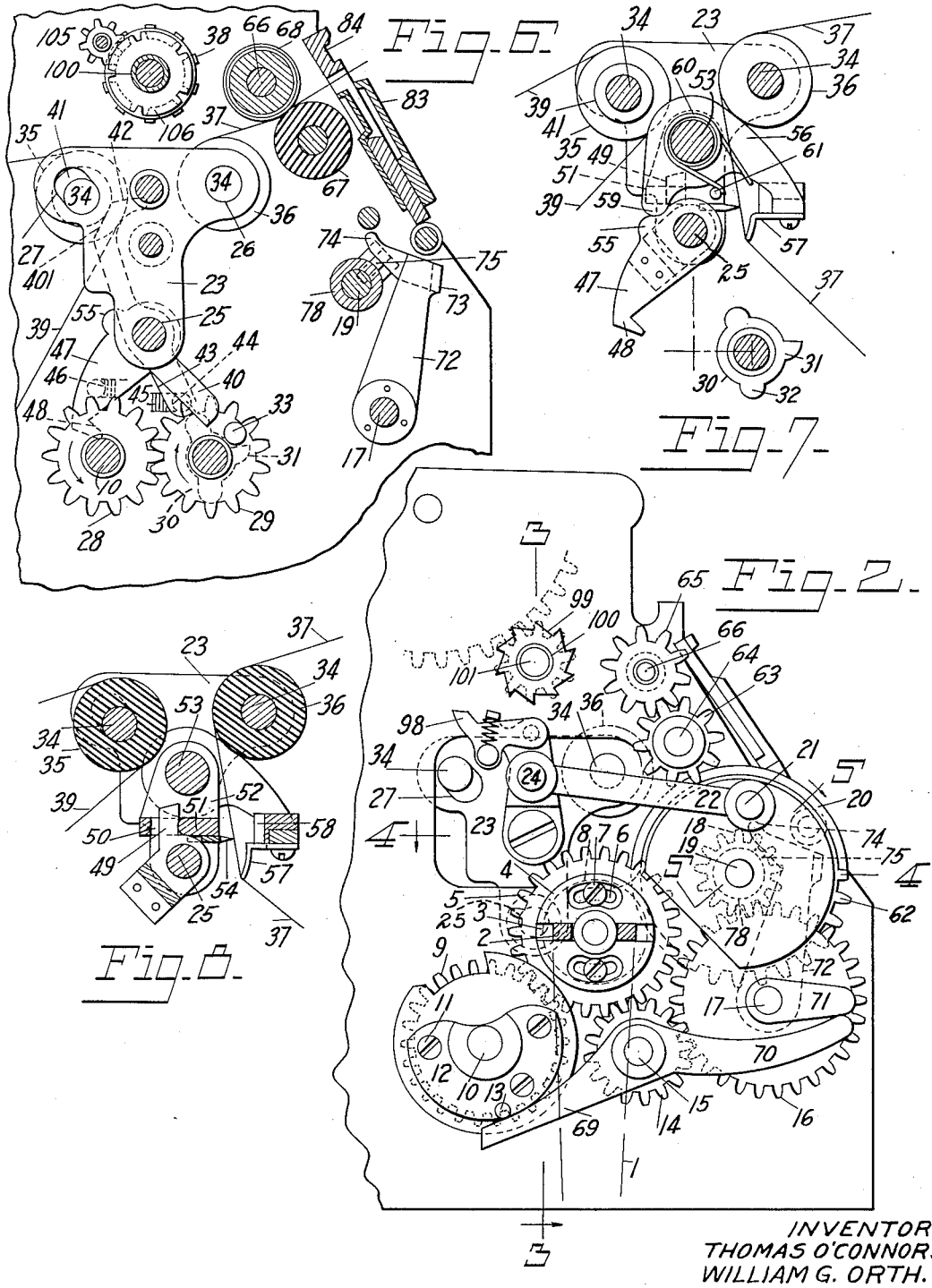

May 29, 1934.  T. O'CONNOR ET AL  1,960,918
DUPLICATE TICKET RECEIPT REGISTER
Filed Jan. 27, 1930    3 Sheets-Sheet 3

INVENTOR.
THOMAS O'CONNOR.
WILLIAM G. ORTH.

Hastings W. Baker
ATTORNEY.

Patented May 29, 1934

1,960,918

UNITED STATES PATENT OFFICE 1,960,918

DUPLICATE TICKET RECEIPT REGISTER

Thomas O'Connor and William G. Orth, Dayton, Ohio, assignors to Ohmer Fare Register Company, Dayton, Ohio Application January 27, 1930, Serial No. 423,701

9 Claims. (Cl. 235—31)

This invention relates to a register adapted to issue duplicate tickets or receipts. For the purpose of illustration the invention is shown as embodied in that type of register shown in the patent of Albert S. Wheelbarger and Grover C. Coil, Number 1,858,813 issued May 17, 1932. Another object of the invention is to provide a machine which will not only issue two tickets or receipts which are substantially duplicates of each other, but to provide means to perforate between the tickets so that they can be easily torn apart and to cut off the two tickets from the ticket strip after the two tickets or receipts have been printed. Another object of the invention is to provide means whereby the same consecutive number will be printed on both the tickets or receipts and means whereby only one impression will be made on the record or detail strip which is retained within the machine for the use of the auditor.

To accomplish the above objects, and others which will appear in the detailed specification which follows, it is necessary to operate a part of the machine twice while the remainder of the machine is being operated only once. It is necessary to operate the ticket printing mechanism twice while the total adder, the consecutive numbering device and the record printing device are operated only once. Referring to the drawings:—

Fig. 1 is a front elevational view with the cabinet and many of the inside parts omitted for the sake of clearness.

Fig. 2 is a side elevational view thereof, the parts being shown in their normal or home position.

Fig. 5 is a sectional view on the line 5—5 of Fig. 2, certain of the parts being shown in cross section.

Fig. 6 is a sectional view on the line 6—6 of Fig. 1, certain of the parts being shown in cross section.

Fig. 7 is a cross sectional view on the line 7—7 of Fig. 3, looking towards the right.

Fig. 8 is a cross sectional view on the line 8—8 of Fig. 3, looking towards the right, and Fig. 9 is a cross sectional view on the line 9—9 of Fig. 1, looking towards the right.

Figure 4:
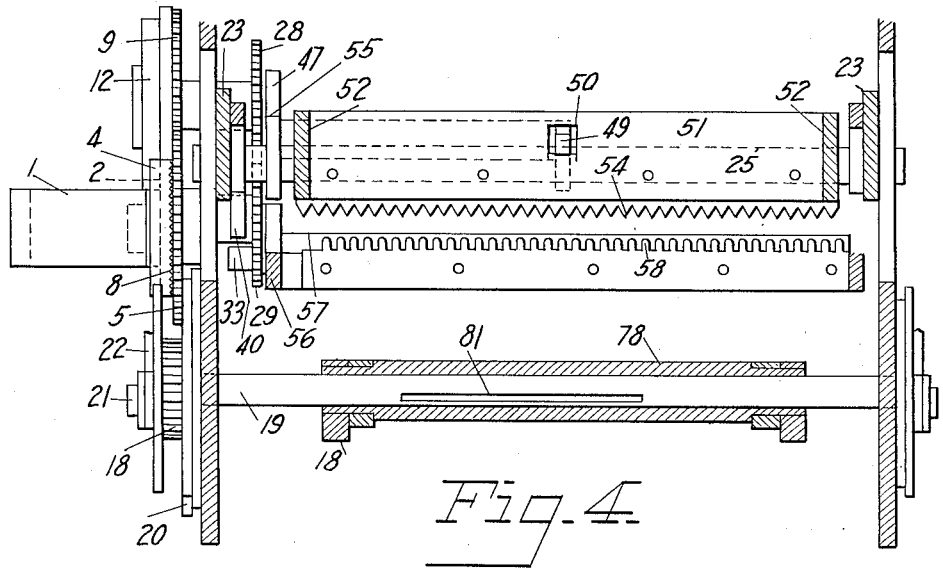
Fig. 4 is a sectional view on the line 4—4 of Fig. 2, certain of the parts being shown in cross section.
Figure 3:
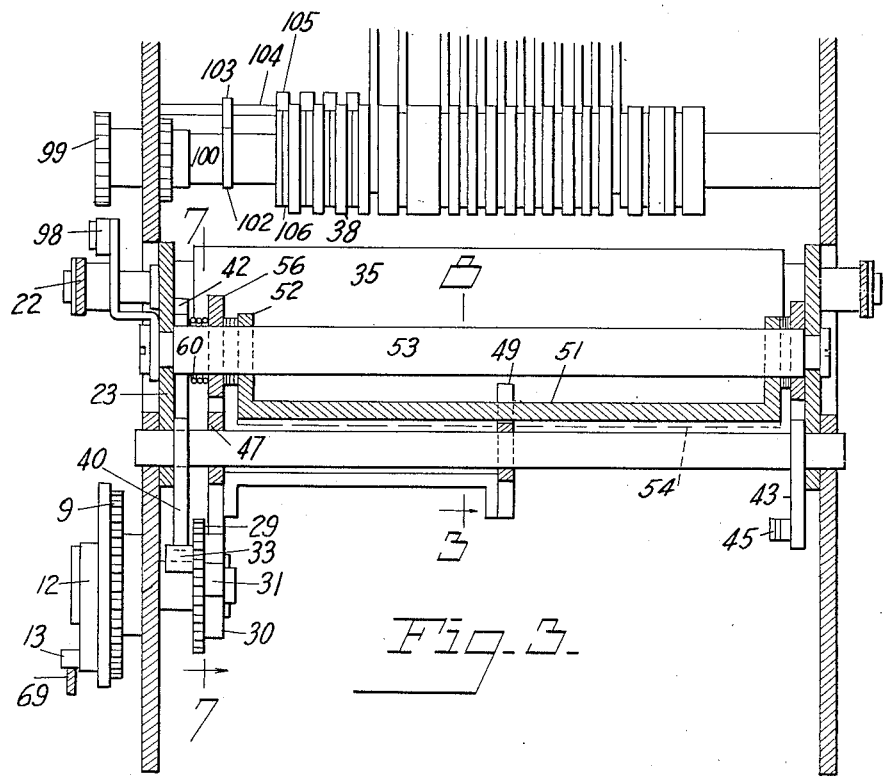
Fig. 3 is a sectional view on the line 3—3 of Fig. 2, certain of the parts being shown in cross section.

The crank handle 1 is provided with a tongue 2 which is received within a groove 3 in a disk 4, which disk is rigidly secured to a gear 5. The disk 4 is provided with concentric grooves 6 through which pass screws 7 secured to the gear 5. The outer face of the gear 5 and the inner face of the disk 4 are provided with very fine radially extending teeth 8 (Fig. 4) so that by loosening the screws 7 the disk 4 may be adjusted to any position within the limits of the circumferential group and by again tightening the screws the disk 4 will be held in its adjusted position with regard to the driven gear 5.

The gear 5 is provided with the same number of teeth as is the gear 9 which is driven thereby. In the present instance each of these is provided with twenty-six teeth. The gear 9 is fast on the shaft 10 and is secured by means of screws 11 to a cam disk 12 which cam disk is provided with a pin 13. The crank handle 1 makes one complete revolution for each complete operation of the machine or if it is motor operated the gear 5 would make one revolution. In either case the gear 5 and gear 9 make one revolution each time the machine is operated.

The gear 5 meshes with and drives a pinion 14 loosely mounted on the shaft 15, which pinion 14 meshes with and drives an idler gear 16 loosely mounted on a shaft 17, which gear 16 meshes with and drives a pinion 18 rigidly mounted on a shaft 19. The pinion 18 is provided with one-half as many teeth as the gear 5 so that the pinion 18 makes two revolutions at each operation of the machine. The gear 18 is provided with a disk 20 which carries a wrist pin 21 which actuates a pitman 22 which is connected to an oscillating printing carrier 23 by means of a wrist pin 24. This oscillating printing carrier 23 therefore makes two complete oscillations each time the machine is operated because the disk 20 makes two revolutions. The oscillating printing carrier is mounted on a shaft 25 and is provided with a circular bearing 26 and an elongated bearing 27, there being similar bearings in the two side plates of the printing carrier.

Secured to the shaft 10 is a pinion 28 which meshes with and drives a pinion 29 having the same number of teeth. It will be remembered that the shaft 10 makes one revolution at each operation of the machine and therefore each of the pinions 28 and 29 make one such revolution. The inner side of the pinion 29 is provided with a cam plate 30 which carries a cam 31 which cam plate is secured to the pinion 29 by means of pin lobes 32. The outer side of the pinion 29 is provided with a pin 33, all of which parts make one revolution at each operation of the machine and revolve in the direction shown by the arrows in Fig. 6. The parts shown in Fig. 6 are shown in their normal position. The bearings 26 and 27 receive shafts 34 on which are mounted a record platen 35 and a ticket platen 36 respectively. As the machine is operated the printing carrier 23 is first moved to the left as shown in Fig. 6, bringing the ticket paper 37 which passes over the platen 36 into engagement with the type wheels 38 making an impression on the said ticket paper. The printing carrier 23 next moves to the right bringing the record paper 39 which passes over the platen 35 beneath the type wheels but inasmuch as the shaft 34 is in the lower portion of the elongated bearing 27, no impression is made on the record paper. The printing carrier next moves back towards the left after the paper has been fed forward thereby printing a second ticket and as the printing carrier again moves towards the left the pin 33 engages a lever 40 fulcrumed on the shaft 25 and rocks it counter-clockwise so that the cam surface 401 on the upper part of the lever 40 engages a disk 41 mounted on the shaft 34 raising the shaft 34 to the upper portion of the elongated bearing 27 so that the surface 42 on the lever 40 now rests beneath the disk 41 thereby positioning the record platen 35 so that it will be in a position to cause the record paper 39 to be pressed against the printing type 38 when the printing carrier is in position to cause such an impression. Just after this impression is taken on the record paper the pin 33 passes beyond the lower end of the lever 40. The lever 40 is provided with an arm 43 which carries a pin 44 to which is connected a spring 45 connected to a pin 46 on a lever 47. This spring pulls the arm 40 clockwise so as to unseat the surface 42 from contact with the disk 41 so that the record platen 35 can drop by means of a spring or gravity to its inoperative position.

It is desirable to perforate between the two tickets which are issued at each operation of the machine and to this end we have provided a nose 48 on the lever 47 which lever is loosely mounted on the shaft 25 and carries an arm 49 at its upper end adapted to engage in a slot 50 in a plate 51 carried by side arms 52 mounted on a shaft 53. The plate 51 is provided with serrated teeth 54 so that if the lever 47 is moved clockwise the said teeth 54 will be projected forwardly and when the lever 47 is moved anti-clockwise the serrated teeth will be retracted to their normal position. The lever 47 is also provided with a cam 55 which engages a bell crank lever 56 which carries a plate 57 (Fig. 4) provided with teeth 58. The teeth 54 fit in between the teeth 58 and the ticket paper passes between these teeth.

The nose 59 on the lever 56 is normally seated slightly above the cam 55 on the lever 47 and this nose 59 bearing against the said lever prevents anything more than a slight movement of the lever 47 for a coil spring 60 passes around the shaft 53 and has one end beneath the lower right-hand surface of the lever 56 and the other end against a pin 61 carried by the oscillating printing carrier. This construction causes the lever 47 to travel normally with the oscillating printing carrier and after the first ticket has been printed the nose 48 of the lever 47 is in the path of movement of the cam 31, which cam moves the lever 47 relative to the oscillating printing carrier and causes the teeth 54 and 58 to engage the paper and perforate it on a horizontal line. The said cam 31 now moves beyond the nose 48 of the lever 47 and the coil spring 60 moves the perforating teeth apart.

The disk 20 as shown in Fig. 2 is provided with a segmental gear 62, the teeth of which engage a pinion 63 mounted on a feed shaft 64. The pinion 63 meshes with and drives a pinion 65 mounted on a feed shaft 66. The feed shafts 64 and 66 carry feed rollers 67 and 68 respectively between which the ticket paper 37 is fed. These feed rollers intermittently feed the paper after it is printed and the feeding is so timed that the first ticket will be printed, serrated and then fed forward. The second ticket will then be printed and again fed forward so that it can be cut off from the remainder of the strip by severing means which will now be described.

The pin 13 as shown in Fig. 2 engages a lever 69 just prior to the end of the operation of the machine. The lever 69 is loosely mounted on the shaft 15 and is provided with an arm 70 which engages an arm 71 of a bell crank lever 72 loosely mounted on the shaft 17. The pin 13 depresses the left-hand end of the lever 69 and therefore elevates the right-hand end thereof rocking the bell crank lever 72 anticlockwise. The bell crank lever 72 is provided with a horizontal arm 73 and a forward extension 74. The forward extension 74 rests over a lever 75 fulcrumed on a pin 76 carried in side walls 77 of a sleeve 78 loosely mounted on the shaft 19. It will be remembered that the shaft 19 makes two revolutions at each operation of the machine. The lever 75 is provided with an arm 79 and a spring 80 tends to force the arm 79 into a groove 81 in the said shaft 19. When the parts are in the home position the left-hand end of the lever 69 as viewed in Fig. 2 is depressed and the extension 74 is in such a position so as to hold depressed the left-hand end of the lever 75 as viewed in Fig. 5, holding the arm 79 out of the groove 81. When the machine is operated and as the shaft 19 now starts its rotation the sleeve 78 remains stationary for the arm 79 does not extend into the slot 81. Shortly after the machine starts to operate however, the pin 13 moves beyond the lever 69 and the spring 80 moves the arm 79 so that when the shaft 19 has completed its first revolution the said arm drops into the slot 81 and during the second revolution of the shaft 19 the sleeve 78 rotates with the shaft 19 so that while the shaft 19 makes two revolutions the sleeve 78 makes only one revolution. The sleeve 78 is provided with two cams 82 which operate a movable knife 83 which cooperates with a fixed knife 84. The lower portion of the movable knife 83 is provided with a U-shaped hook 85 which receives a knob 86 of a bell crank lever 87 pivoted on a pin 88 which pin is supported by a plate 89 loosely mounted on the shaft 19 and cross bar 90. The other end of the bell crank lever 87 is provided with an off-set lug 91 which projects into the path of movement of the cam 82 rigidly secured to the sleeve 78. A bell crank lever 92 is pivoted on the cross bar 90. One arm of the bell crank lever 92 is provided with a cam surface 93 which is engaged by the said cam 82. The other arm of the bell crank lever 92 is provided with a cam 94 which engages the lower beveled edge 95 of the lug 91. Beyond the cam 94 is a recess 96 in the bell crank lever 92 to receive the lug 91. The bell crank lever 92 terminates in a cam portion 97. The parts are normally in the position shown in Fig. 9. As the sleeve 78 starts its rotation the cam 82 is in engagement with the cam surface 93. As the cam rotates in a counter-clockwise direction as viewed in Fig. 9 it rotates the bell crank lever 92 in a clockwise direction so that the cam 94 engages the lower beveled surface 95 of the lug 91 rotating the bell crank lever 87 clockwise and lowering the movable knife 83 slightly. The movable knife 83 is now held in this position by the lug 91 engaging the forward side of the recess 96. As the cam 82 continues this rotation it engages the cam portion 97 of the bell crank lever 92 rotating the lever 92 in a counter-clockwise direction and thereby lowering the forward edge of the recess 96 below the lug 91. The cam 82 now engages the lug 91 of the bell crank lever 87 rotating the said bell crank lever in a counter-clockwise direction and causing the knife to sever the paper. When the cam 82 has passed the lug 91 it engages for a second time the cam surface 93 rotating the bell crank lever 92 in a clockwise direction so that the cam 94 again engages the beveled surface 95 of the lug 91 thereby rotating the bell crank lever 87 in a clockwise direction and lowering the knife to its initial position as shown in Fig. 9.

The consecutive numbering device is operated by a pawl 98 pivoted on the oscillating printing carrier, which pawl engages a ratchet 99 secured to a sleeve 100 mounted on a shaft 101. The sleeve 100 is provided with a Geneva gear 102 which meshes with a Geneva pinion 103 secured to a shaft 104 which carries a Geneva pinion 105 which meshes with and drives a units wheel 106 of the consecutive number printing wheels. The Geneva gear is such that the units wheel 106 is advanced one unit for every two teeth operated of the ratchet 99. We realize that many changes might be made in the specific form in which this invention is shown and we therefore desire to claim the same broadly except as we may limit ourselves in the annexed claims. Having now described our invention, we claim:

1. In a receipt issuing machine, a carrier, a platen mounted thereon and having a fixed axis relative to said carrier, a second platen, a shaft on which the second platen is mounted, which shaft extends through a slot-like bearing in said carrier and means whereby said shaft may be elevated to bring said second platen into operative position.

2. In a receipt issuing machine, type, an oscillating carrier, a platen mounted thereon having a fixed axis relative to said carrier and adapted to engage said type, a second platen, means whereby said second platen may be elevated into such a position so that when said carrier is operated said second platen will engage said type.

3. In a printing machine, an oscillating carrier, a platen, a shaft on which said platen is mounted, which shaft projects through slot-like bearings in said carrier and means whereby said platen may be elevated so as to raise said platen to effective position.

4. In a printing machine, type, an oscillating carrier having slots on the opposite sides thereof, a shaft extending through said slots, a platen mounted on said shaft, means whereby said shaft may be elevated so that as said platen oscillates said platen may be brought into printing position relative to said type, said means including a lever having a cam surface thereon and a cam whereby said lever is operated so as to move said cam surface to elevate said shaft.

5. In combination, an oscillating carrier, elongated bearings carried by said carrier, a platen mounted in said bearings, and means whereby said platen is forced to the outer end of said bearings during a portion of the operation of said carrier.

6. In a machine of the class described, an oscillating printing frame adapted to be oscillated twice on each actuation of the machine, means whereby on the first oscillation of the printing carrier a record is printed as said frame moves in one direction and a part of a ticket is printed as said frame moves in the opposite direction, and means to render the record printing means inoperative on the second oscillation so that only a part of a ticket is printed on said second oscillation.

7. In a machine, type, a printing carrier, means whereby the printing carrier is oscillated twice on each operation of the machine, a platen carried by said carrier adapted to engage said type on each oscillation of the printing carrier, a second platen carried by said printing carrier, and means to cause said second platen to be brought into operative position with said type only on alternate oscillations of said carrier.

8. In a ticket issuing machine, type, a carrier, means whereby said carrier is oscillated twice, platens carried by said carrier, means whereby said carrier is oscillated so as to bring successively both of said platens into printing contact with said type, and means whereby one of said platens is rendered inoperative when said carrier is again oscillated.

9. In a receipt issuing machine, an oscillating carrier, printing type, two platens carried by said carrier, means whereby one of said platens is brought into printing engagement with said type each time said carrier is oscillated, and means controlling the other of said platens whereby it will be brought into printing engagement with said type only one-half as many times as the first platen.

THOMAS O'CONNOR.
WILLIAM G. ORTH.